(12) United States Patent
Durrant (10) Patent No.: US 9,267,227 B2
(45) Date of Patent: Feb. 23, 2016

(54) ODOR REMOVAL TREATMENT COMPRISING A PEROXIDE/CARBONATE MIXTURE

(71) Applicant: Harris Research, Inc., Logan, UT (US)

(72) Inventor: Edward E. Durrant, Paradise, UT (US)

(73) Assignee: Harris Research, Inc., Logan, UT (US)

( * ) Notice: Subject to any disclaimer, the term of this patent is extended or adjusted under 35 U.S.C. 154(b) by 264 days.

(21) Appl. No.: 13/660,761

(22) Filed: Oct. 25, 2012

(65) Prior Publication Data
US 2013/0283560 A1 Oct. 31, 2013

Related U.S. Application Data

(60) Provisional application No. 61/551,333, filed on Oct. 25, 2011.

(51) Int. Cl.
| | | |
|---|---|---|
| *C11D 3/10* | (2006.01) | |
| *C11D 3/33* | (2006.01) | |
| *C11D 7/08* | (2006.01) | |
| *C11D 7/12* | (2006.01) | |
| *C11D 9/12* | (2006.01) | |
| *D06F 39/02* | (2006.01) | |
| *B60S 3/00* | (2006.01) | |
| *C11D 17/00* | (2006.01) | |
| *C11D 3/00* | (2006.01) | |
| *C11D 3/39* | (2006.01) | |
| *C11D 11/00* | (2006.01) | |

(52) U.S. Cl.
CPC .............. *D06F 39/022* (2013.01); *B60S 3/008* (2013.01); *C11D 3/0068* (2013.01); *C11D 3/3947* (2013.01); *C11D 7/12* (2013.01); *C11D 11/0017* (2013.01); *C11D 17/0008* (2013.01)

(58) Field of Classification Search
CPC ...... C11D 3/0031; C11D 3/0052; C11D 3/10; C11D 3/33; C11D 3/3956; C11D 7/08; C11D 7/12; C11D 9/12; C11D 9/446; C11D 11/0017; C11D 11/0064; C11D 11/007
See application file for complete search history.

(56) References Cited

U.S. PATENT DOCUMENTS

| | | | | |
|---|---|---|---|---|
| 4,687,663 | A * | 8/1987 | Schaeffer .................... | 424/52 |
| 5,085,853 | A * | 2/1992 | Williams et al. ............. | 424/53 |
| 5,902,568 | A * | 5/1999 | Ryles et al. .................. | 424/53 |
| 2005/0282722 | A1* | 12/2005 | McReynolds et al. ........ | 510/302 |
| 2006/0276363 | A1* | 12/2006 | Cagnina et al. .............. | 510/284 |
| 2007/0152187 | A1* | 7/2007 | Truchlaeft ............... | 252/186.21 |
| 2009/0165822 | A1* | 7/2009 | Kintz et al. ................... | 134/18 |
| 2010/0018990 | A1* | 1/2010 | Eklund et al. ................. | 222/1 |
| 2011/0119843 | A1* | 5/2011 | Nikitczuk et al. ............ | 15/21.1 |
| 2011/0215113 | A1* | 9/2011 | Hansen et al. ................ | 222/136 |
| 2012/0066850 | A1* | 3/2012 | Pisacane et al. ............ | 15/104.92 |
| 2012/0149623 | A1* | 6/2012 | Li et al. ....................... | 510/214 |

* cited by examiner

*Primary Examiner* — Charles Boyer
(74) *Attorney, Agent, or Firm* — Kunzler Law Group (57) ABSTRACT

A system and method are disclosed for an odor removal treatment system that includes a liquid oxidizing agent that includes a peroxide and water, a liquid buffering agent that includes a carbonate salt and water, and a cleaning device, wherein the liquid oxidizing agent is stored separately from the liquid buffering agent in a pre-application mode, and combinable with the liquid buffering agent to form a solution in an application mode just prior to applying the solution to a textile. The cleaning device may be a portable vacuum cleaning mechanism onboard a vehicle. The peroxide may be hydrogen peroxide and the solution may have a hydrogen peroxide weight percent of about 1.5%.

15 Claims, 5 Drawing Sheets

ODOR REMOVAL TREATMENT COMPRISING A PEROXIDE/CARBONATE MIXTURE

CROSS-REFERENCES TO RELATED APPLICATIONS

This application claims the benefit of U.S. Provisional Patent Application No. 61/551,333 entitled Odor Removal Treatment and filed on Oct. 25, 2011 for Edward E. Durrant, which is incorporated herein by reference.

FIELD

This invention relates to cleaning systems and more particularly relates to liquid odor removal treatment systems.

BACKGROUND

In the cleaning industry, cleaning compounds, such as soaps, detergents, and surfactants, are used for extracting contaminants from the surface of a textile. Generally, such cleaning compounds are effective because their chemical structures include both polar (hydrophilic) and non-polar (hydrophobic) components. Therefore, cleaning compounds can be dissolved with a polar solvent, such as water, and are capable of dissolving and extracting non-polar solutes, such as oil, grease, dirt, and other contaminants. Once the contaminants have been extracted from the textile, the solution, now holding the suspended contaminants, can then be lifted from the textile and expelled, thus leaving behind a clean surface.

In some applications, extracting contaminants from the textile is not the main goal. For example, when treating textiles that have an unpleasant smell (i.e. textiles that have been saturated with animal urine), some cleaning compounds target the malodorous contaminants to simply mask the bad smell. Other compounds do not mask the smell but instead alter the malodorous contaminants in such a way so as to decrease the foul odor that emanates from them.

However, conventional cleaning compounds are often stored as solids and require thorough mixing in order to dissolve the solid cleaning compounds into the cleaning solvent (e.g. water). This process of thoroughly mixing the solid cleaning chemical into a solvent can take a lot of time and may reduce the cleaning power of the chemical compound.

For example, a cleaning crew that drives a portable cleaning vehicle to a site may have to spend valuable time ensuring that the proper amount of solid chemicals are dissolved into a cleaning solvent and that the solid chemicals are sufficiently suspended in the solvent. Once dissolved, the cleaning crew must continually check to make sure that solid cleaning compounds do not precipitate out of solution, which would decrease the cleaning/oxidizing power of the cleaning system and potentially waste valuable chemicals. Additionally, any solid cleaning compounds that are not completely dissolved into the solvent may remain on the textile after the cleaning process and thus toxic and/or harmful chemicals may be left at the cleaning site.

SUMMARY

From the foregoing discussion, it should be apparent that a need exists for a system and method that utilize a liquid cleaning system for treating malodorous contaminants. Beneficially, such a system and method involve separate liquid cleaning agents that are mixed prior to the cleaning process.

The subject matter of the present application has been developed in response to the present state of the art, and in particular, in response to the problems and needs in the art that have not yet been fully solved by currently available cleaning systems. Accordingly, the present disclosure has been developed to provide a system and a method for treating malodorous compounds that overcome many or all of the above-discussed shortcomings in the art.

The present disclosure relates to an odor removal treatment system that includes a liquid oxidizing agent that includes a peroxide and water, a liquid buffering agent that includes a carbonate salt and water, wherein the liquid oxidizing agent is stored separately from the liquid buffering agent in a pre-application mode, and combinable with the liquid buffering agent to form a solution in an application mode just prior to applying the solution to a textile. The peroxide may be hydrogen peroxide. In one implementation, the system may further include ethylene diamine tetra-acetic acid (EDTA) as a stabilizing compound, the EDTA forming part of the buffering agent in the pre-application mode. In another implementation the system may include citric acid as a stabilizing compound, the citric acid forming part of the buffering agent in the pre-application mode.

The odor treatment system may have a solution that has a hydrogen peroxide weight percent in the range of between about 0.1% and 15%. In another implementation the system may have a hydrogen peroxide weight percent in the range of between about 0.5% and 5%. In yet another implementation, the system may have a hydrogen peroxide weight percent of about 1.5%. The pH of the system may be in the range of between about 8 and 12. In another embodiment the pH of the system may be in the range of between about 9 and 11. In yet another embodiment the pH of the system may be about 10.

Another embodiment of an odor removal treatment system may include a liquid oxidizing agent that includes a peroxide and water, a liquid buffering agent that includes a carbonate salt and water, and a cleaning device, wherein the liquid oxidizing agent is stored separately from the liquid buffering agent in a pre-application mode, and combinable with the liquid buffering agent to form a solution in an application mode just prior to applying the solution to a textile. The cleaning device may be a portable vacuum cleaning mechanism onboard a vehicle.

The present disclosure also relates to a method for treating textiles to remove odor molecules that includes providing an oxidizing agent that includes hydrogen peroxide and water, providing a buffering agent that includes a carbonate salt and water, combining the oxidizing agent and the buffering agent within a container to form a solution, and applying the solution to a textile to remove odor molecules from the textile. The method may also include mixing in secondary water with the oxidizing agent and the buffering agent to dilute the solution. In addition to treating the malodorous contaminants, the solution may also remove stain molecules from the textile.

The combining the oxidizing agent and the buffering agent within a container may include physically mixing the two agents for duration of between about 5 seconds and 5 minutes. In another embodiment, combining the oxidizing agent and the buffering agent within a container may include physically mixing the two agents for duration of between about 10 seconds and 1 minute. In yet another embodiment, combining the oxidizing agent and the buffering agent within a container may include physically mixing the two agents for about 15 seconds.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure.

These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the disclosure will be readily understood, a more particular description of the disclosure briefly described below will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1A:
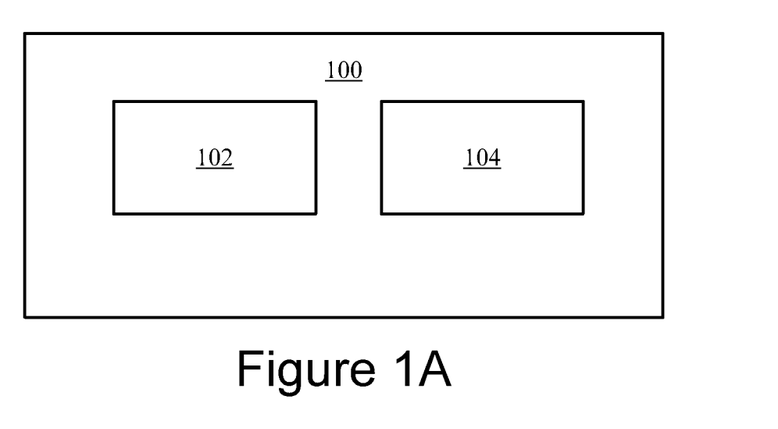
FIG. 1A depicts one embodiment of an odor removal treatment system.

FIG. 1A depicts one embodiment of an odor removal treatment system 100. The odor removal treatment system 100, as described throughout the pages of the disclosure, generally includes an oxidizing agent 102 and a buffering agent 104. The oxidizing agent 104 is an aqueous solution containing a peroxide and the buffering agent 104 is an aqueous solution containing a carbonate salt. The two agents 102, 104 are stored separately in a pre-application mode but may be combined to form a solution in an application mode prior to cleaning a textile. Further details relating to the oxidizing agent 102, the buffering agent 104, and the method 500 for using the odor removal treatment system are included below.

Figure 1B:
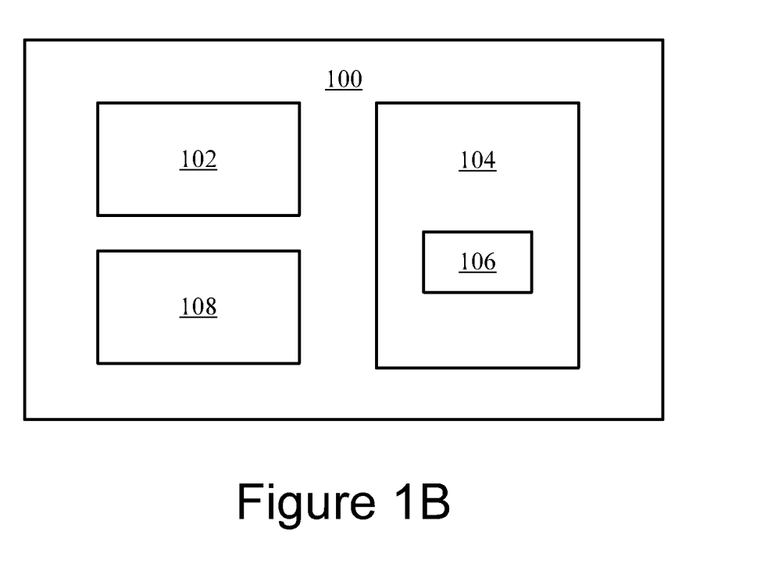
FIG. 1B depicts another embodiment of an odor removal treatment system.

FIG. 1B depicts another embodiment of an odor removal treatment system 100. In the depicted embodiment, the system 100 includes an oxidizing agent 102, a buffering agent 104, a stabilizing agent 106, and a cleaning device 108. The oxidizing agent 102, the buffering agent 104, and the stabilizing agent 106 are described in greater detail below with reference to FIGS. 2-5.

The cleaning device 108 may be any cleaning applicator for treating a textile. In one embodiment, the cleaning device 108 may be a wet vacuum cleaner that dispenses the cleaning solution onto a textile prior to extracting the contaminants with the vacuum. In another embodiment, the cleaning device 108 may be a portable cleaning mechanism onboard a van/truck. It is anticipated that other cleaning devices 108 may be used in accordance with the present disclosure and that such other cleaning devices 108 will be recognized by those of ordinary level of skill in the art as falling under the scope of the present disclosure.

Figure 2:
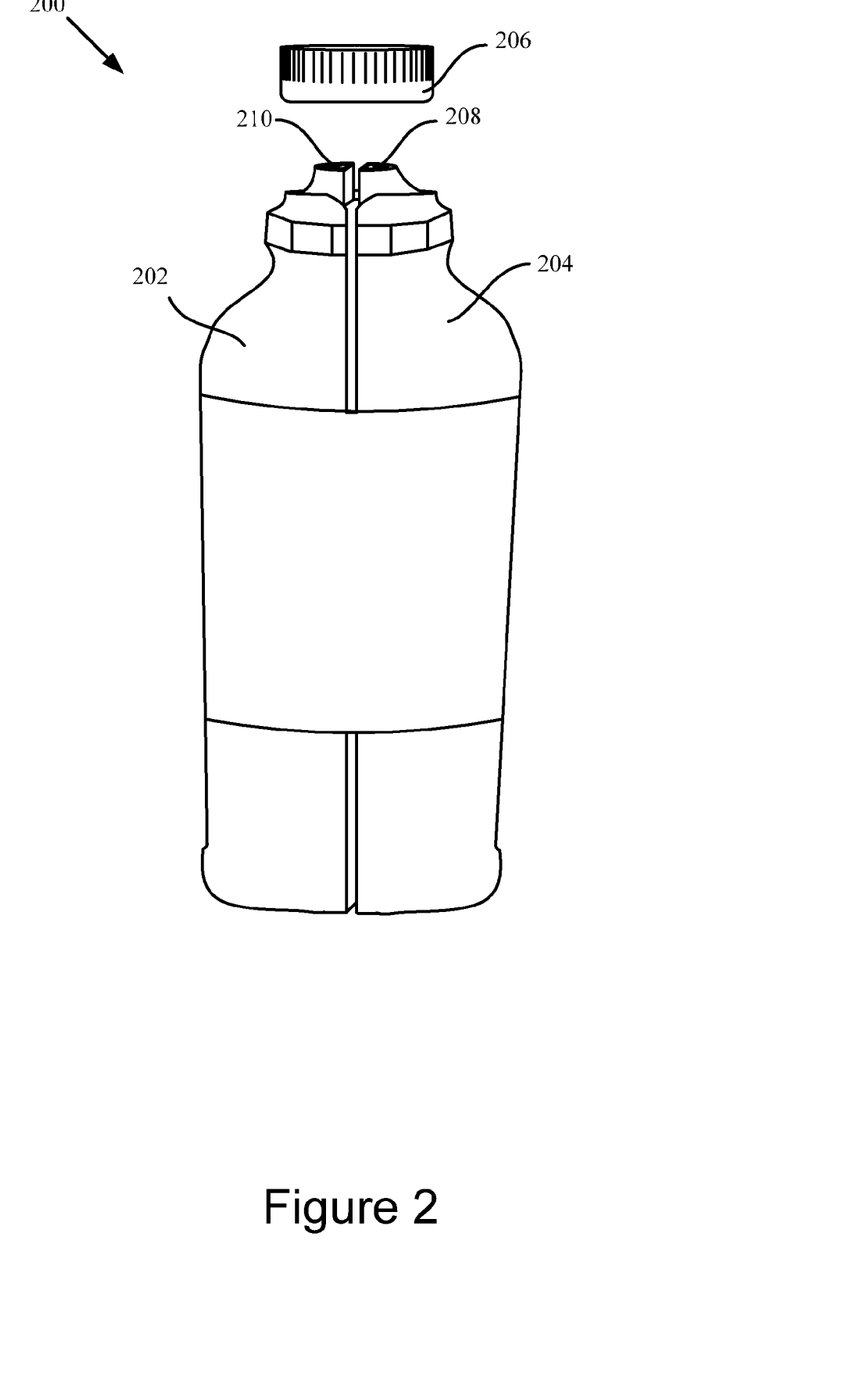
FIG. 2 depicts one embodiment of a container forming part of an odor removal treatment system.

FIG. 2 depicts one embodiment of a container 200 forming part of an odor removal treatment system. The system includes two aqueous solutions stored separately in a pre-application mode which are combined to form a cleaning solution in an application mode just prior to administering the odor removing treatment. The container includes two chambers 202, 204 which separately contain the two solutions and prevent them from mixing together prematurely. In one embodiment, the separate chambers have equal volumes. In yet another embodiment, the chambers have different volumes, depending on the characteristics of the agents contained therein. FIG. 2 depicts a cap 206 removed from respective pouring spouts 208, 210 of the two chambers 202, 204. It is contemplated that the container 200 may have one cap 206 to cover both of the spouts, as illustrated, or, alternatively, the container may have two separate caps each covering a respective spout. The container may be constructed of glass, plastic, or other material recognized by those of ordinary level of skill in the art as capable of use in storing and containing hydrogen peroxide or a similar solution.

One embodiment of the present disclosure provides hydrogen peroxide as the active component in the oxidizing agent. Hydrogen peroxide is a strong oxidizer. During the treatment of the affected textiles, the hydrogen peroxide oxidizes the odor molecules into non-malodorous compounds. For example, pet urine odor molecules may be oxidized and rendered non-malodorous. Since an aqueous solution of hydrogen peroxide is relatively stable at room temperature and hydrogen peroxide will not substantially decompose into oxygen and water unless activated, the present disclosure provides a buffering agent to activate the hydrogen peroxide once the two agents are mixed.

Once the hydrogen peroxide combines with the buffering agent, the activated hydrogen peroxide can be applied to a textile to oxidize the malodorous molecules. Other peroxides may also be used in accordance with the present disclosure. In one embodiment, aqueous inorganic peroxide salts may be selected and used as the liquid oxidizing agent 102. For example, in certain applications lithium or barium peroxide may be used as in the oxidizing agent 102. The selection of a peroxide is dependent on the specifics of a given application. For example, the selection of a peroxide may depend on the type of textile and the type of buffering agent that are used in the system.

Preferably, the buffering agent is a solution of water and a carbonate salt. In the present disclosure, the buffering agent increases and subsequently stabilizes the pH of the solution in order to regulate the decomposition of the hydrogen peroxide. It is contemplated that alkali metals, such as sodium and potassium, may be employed as the cations of the carbonate salt. For example, sodium carbonate may be used as the carbonate salt and, upon mixing an amount of sodium carbonate solution with the oxidizing solution, the pH of the solution may rise to between about 9 and 10. With the solution having a basic pH, the hydrogen peroxide becomes active and is able to effectively oxidize the pet urine molecules and render them non-malodorous. In some embodiments the pH of the solution may be limited by the type of textile that is to be cleaned. For example, certain nylon carpets may begin to decompose or otherwise deteriorate in highly basic solutions.

In one embodiment, the buffering agent may further include other stabilizing compounds that assist in the regulation of the oxidation reaction. For example, the counter-ion in the carbonate salt may undesirably act as a catalyst for the decomposition of the hydrogen peroxide or otherwise affect the ability of the hydrogen peroxide to oxidize the odor molecules. Therefore, chelating or sequestering compounds such as ethylene di-amine tetra-acetic acid (EDTA) and citric acid may be added to the buffering agent to sequester the counter-ion of the carbonate salt and provide the user with more control over the cleaning process by further regulating the decomposition of the oxidizing agent 102.

Figure 3:
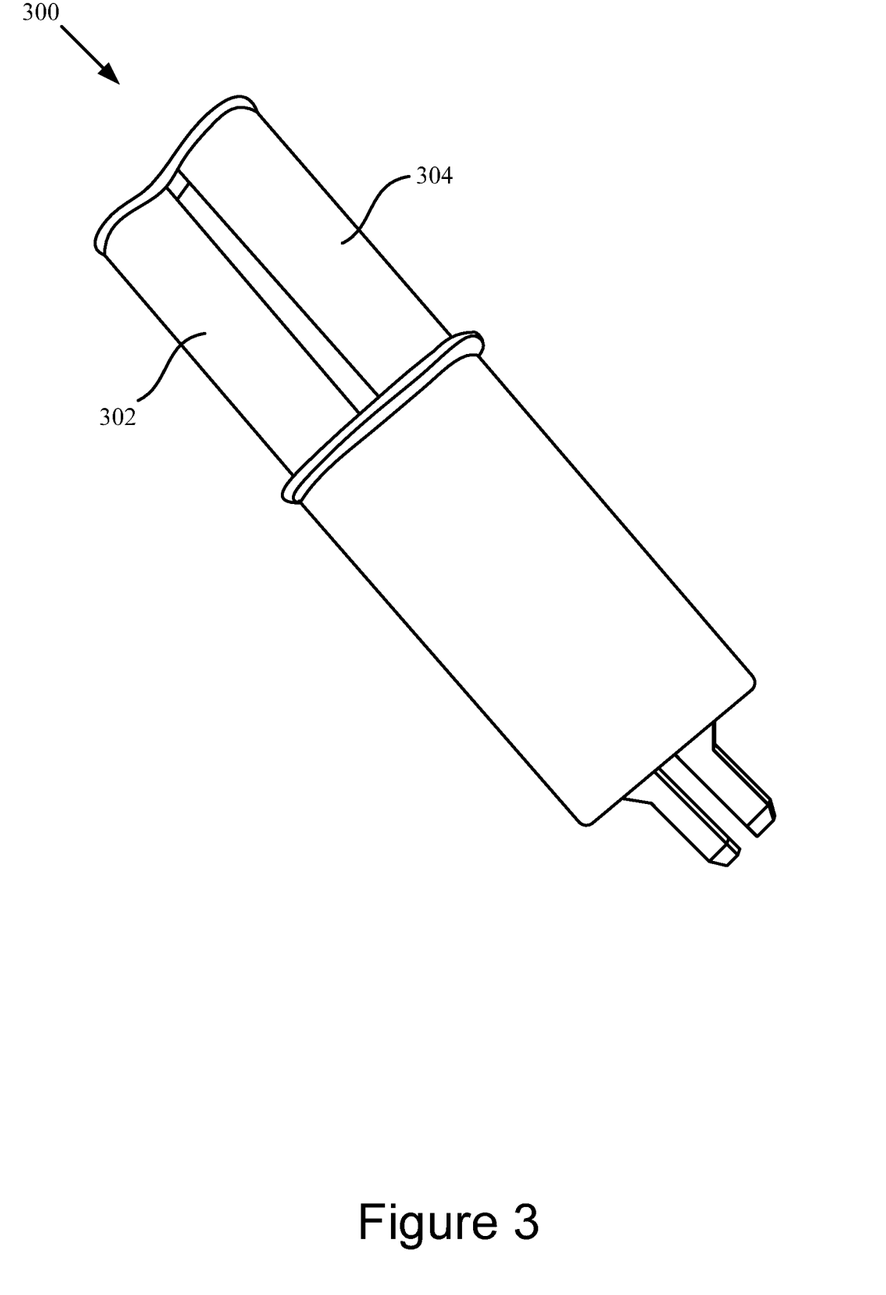
FIG. 3 depicts another embodiment of a container forming part of an odor removal treatment system.

FIG. 3 depicts another embodiment of a container 300 capable of use in an odor removal treatment system. The container includes two separate chambers 302, 304 that can dispense of the oxidizing agent and the buffering agent at the same time for mixing. This container differs from the container 200 described above with reference to FIG. 2 because it has an appearance and functionality substantially similar to that of a syringe. In one embodiment, this container may be used when lesser amounts of the oxidizing agent and the buffering agent are required. For example, small areas of a textile that may have only been minimally permeated by odor molecules may only require a light application of the odor removal treatment system.

Although the illustrated systems described with reference to FIGS. 2 and 3 both depict the oxidizing agent and the buffering agent stored within the same container, in other embodiments, the oxidizing agent and the buffering agent are not stored within the same container, but instead are stored in two separate and independent containers (see description of FIG. 4). For example, two bottles, one containing the oxidizing agent and the other containing the buffering agent, may comprise the odor removal treatment system. The contents of the two bottles can then be mixed just prior to cleaning the textiles.

Once again, the oxidizing agent and the buffering agent are kept separate from each other in the system so that the hydrogen peroxide does not substantially decompose before the solution can be applied to the textile. By maintaining the two agents separate, the oxidizing power of the hydrogen peroxide is preserved until the user is ready to apply the solution to the textile. The present disclosure uses an oxidizing agent and a buffering agent in their liquid state so that the two agents can be mixed quickly and completely. Further, since the two agents are liquids, the solution does not require time to dissolve solid compounds nor will there be any powder rings from undissolved salts left behind after applying the solution.

Although somewhat unexpected, the liquid system not only removes the odor molecules, but it also removes some of the stain molecules from the textile. Following observation of the removal of the stain molecules from the textile, it was assumed that the liquid system facilitated removal of the stain molecules because the oxidizing power of the hydrogen peroxide was preserved until just prior to treating the textile, thereby increasing the effectiveness of the oxidation reaction. If the liquids were combined before the cleaning solution was ready to be applied to a textile, the peroxide would begin to off-gas and the oxidizing power of the oxidizing agent would diminish.

Figure 4:
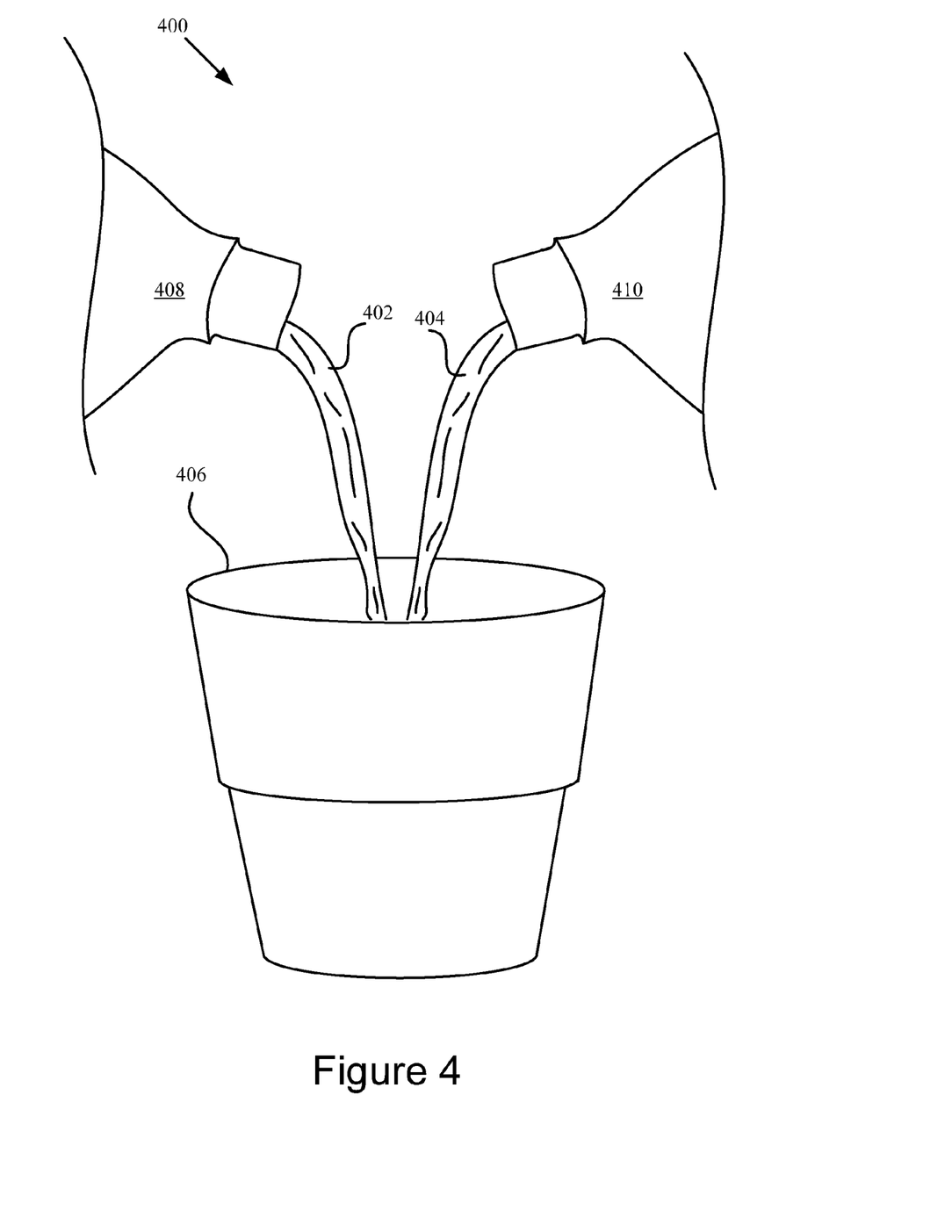
FIG. 4 depicts one embodiment of a method for mixing an oxidizing agent with a buffering agent within a container to form a solution for use in an odor removal treatment.

FIG. 4 depicts one embodiment of mixing 400 an oxidizing agent 402 with a buffering agent 404 within a container 406 to from a solution. The two agents are contained in two separate bottles 408, 410 and are mixed just prior to applying the odor removal treatment to a textile. In one embodiment, the two agents are mixed in the range of between about 5 seconds and 5 minutes before applying the solution to the textile. In another embodiment, the two agents are mixed in the range of between about 10 seconds and 1 minute before applying the solution to the textile. In yet another embodiment, the two agents are mixed about 15 seconds before applying the solution to the textile.

As referenced above, the liquid cleaning system 100 of the present disclosure is easy and fast to prepare. In one embodiment where the cleaning system 100 is implemented in a portable cleaning van, the time required to mix the two liquid agents 102, 104 is substantially less than the time required to dissolve a solid cleaning compound into a cleaning solvent. Additionally, the dissolved solid cleaning compounds do not always remain in solution and may precipitate out of solution, thus decreasing the cleaning/oxidizing power of the cleaning system and potentially wasting valuable chemicals. While solid cleaning compounds may be easier and less expensive to transport to and from cleaning sites, especially if the cleaning water is provided at the cleaning site, the advantages of the liquid system—i.e. the ease of preparation and the effectiveness of the cleaning solution—outweigh the possibility of higher transportation costs.

In one embodiment, the oxidizing agent 402 and buffering agent 404 may include all the water necessary for the solution. In another embodiment, the oxidizing agent 402 and the buffering agent 404 may contain a comparatively lesser amount of water, thereby requiring water to be added upon mixing the two components so that the solution has an appropriate concentration of hydrogen peroxide and carbonate salt. In one embodiment, the appropriate weight percent of hydrogen peroxide in the aqueous solution is in the range of between about 0.1% and 15%. In another embodiment, the range is between about 0.5% and 5%. In yet another embodiment, the weight percent of hydrogen peroxide in the aqueous solution is about 1.5%.

In one embodiment, there is enough carbonate salt in the aqueous solution to raise the pH to the range of between about 8 and 12. In another embodiment, the pH range is between about 9 and 11. In yet another embodiment, the amount of carbonate salt in the aqueous solution is such that the solution has a pH of about 10. The example as described previously with reference to FIG. 1, shows one embodiment of actual values and amounts that may be used in the present disclosure to yield a solution with 1.5 weight percent hydrogen peroxide and a pH of about 10.

Figure 5:
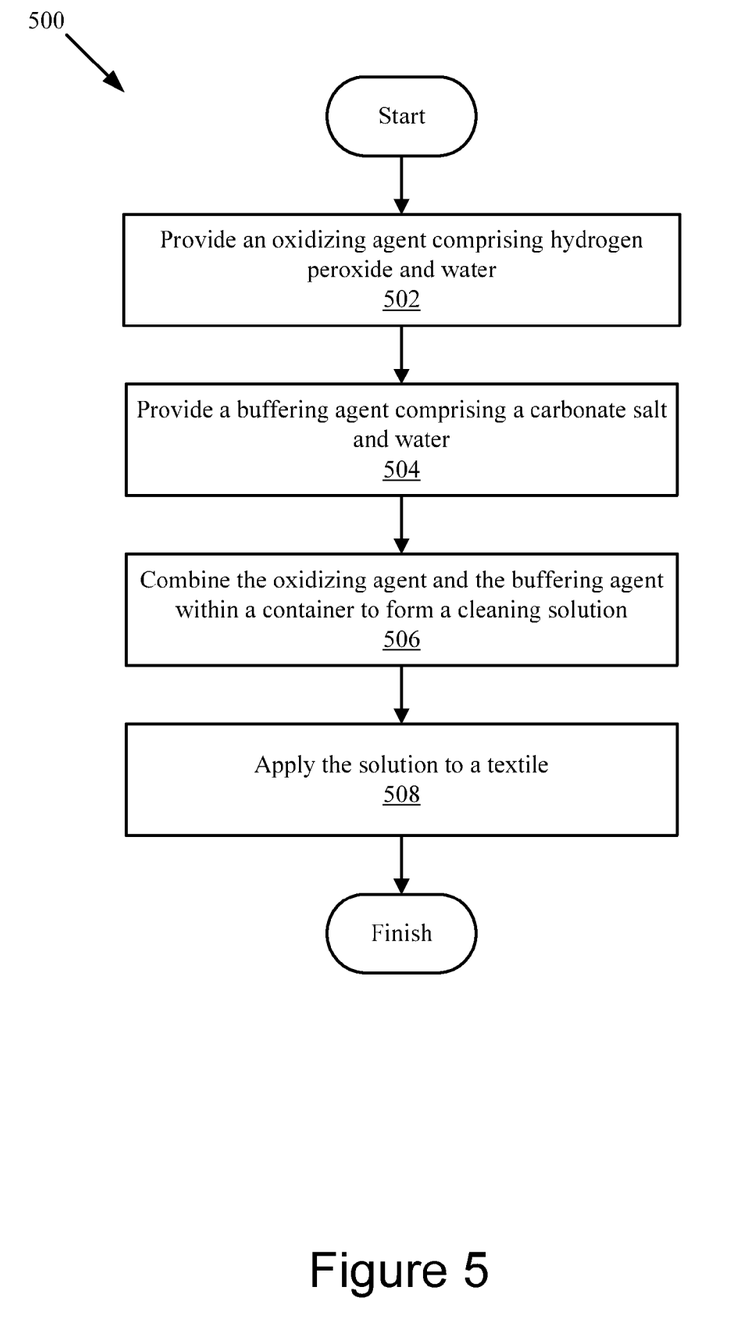
FIG. 5 is a schematic flow chart diagram of one embodiment of a method for using an odor removal treatment.

FIG. 5 is a schematic flow chart diagram 500 of one embodiment of a method for using an odor removal treatment. The method starts by providing 502 a liquid oxidizing agent and providing 504 a buffering agent and accompanying stabilizing compounds. The method continues by combining 506 the oxidizing agent and the buffering agent in a container to form a solution. Additional water may be added during this step in order to dilute the oxidizing agent to a desired concentration For example, the oxidizing agent, according to one embodiment may be an aqueous solution comprising 15 weight percent hydrogen peroxide and the aqueous buffering agent may be a solution comprising 19 weight percent potassium carbonate with 1 weight percent tetrapotassium EDTA and 5 weight percent citric acid. In such an implementation, about 12 ounces of each of the oxidizing agent and the buffering agent may be combined with about 104 ounces of water to form a solution. The resultant solution can then be agitated for several seconds to ensure complete mixing.

With the solution prepared, the method may continue by applying 508 the solution to the areas of the textile that have been permeated with odor molecules. In one embodiment the user may use a cloth to dab the affected area of the textile with the solution or the user may spray the area with the solution; it is contemplated that other methods may be used for applying the solution to a textile.

After the solution has soaked into the affected areas of the textile, the hydrogen peroxide oxidizes the pet urine odor molecules. The method ends once the pet urine molecules have been oxidized into non-malodorous compounds. Excess moisture and soil may then be removed by scrubbing the affected area with a clean cloth, vacuuming the area, or any other method for removing moisture and soil from a textile recognized by those of ordinary skill in the art.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Furthermore, the described features, structures, or characteristics of the disclosure may be combined in any suitable manner in one or more embodiments. In the following description, numerous specific details are provided. However, one skilled in the relevant art will recognize that the disclosure may be practiced without one or more of the specific details, or with other methods, components, materials, and so forth. In other instances, well-known structures, materials, or operations are not shown or described in detail to avoid obscuring aspects of the disclosure.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method.

Additionally, the format and symbols employed are provided to explain the logical steps of the method and are understood not to limit the scope of the method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

What is claimed is:

1. An odor removal treatment system comprising:
    a liquid oxidizing agent comprising a peroxide and water, wherein the liquid oxidizing agent has a peroxide weight percent of about 15%;
    a liquid buffering agent comprising a carbonate salt and water; and
    secondary water,
    wherein the liquid oxidizing agent is stored separately from the liquid buffering agent and separately from the secondary water in a pre-application mode, wherein the liquid oxidizing agent is combinable with the liquid buffering agent and the secondary water to form a solution in an application mode, wherein the liquid oxidizing agent, the liquid buffering agent, and the secondary water are mixed for a duration of between about 10 seconds and 1 minute before to applying the solution to a textile, wherein the solution has a peroxide weight percent of about 1.5%.

2. The system of claim 1, wherein the peroxide is hydrogen peroxide.

3. The system of claim 1, further comprising EDTA as a stabilizing compound, the EDTA forming part of the buffering agent in the pre-application mode.

4. The system of claim 1, further comprising citric acid as a stabilizing compound, the citric acid forming part of the buffering agent in the pre-application mode.

5. The system of claim 1, wherein the solution has a pH in the range of between about 8 and 12.

6. The system of claim 1, wherein the solution has a pH in the range of between about 9 and 11.

7. The system of claim 1, wherein the solution has a pH of about 10.

8. An odor removal treatment system comprising:
    a liquid oxidizing agent comprising a peroxide and water, wherein the liquid oxidizing agent has a first peroxide weight percent;
    a liquid buffering agent comprising a carbonate salt and water; and
    a cleaning device coupleable in water receiving communication with a secondary water source;
    wherein the liquid oxidizing agent is stored separately from the liquid buffering agent in a pre-application mode, wherein the liquid oxidizing agent is combinable with the liquid buffering agent and secondary water from the secondary water source to form a solution in an application mode, wherein the liquid oxidizing agent, the liquid buffering agent, and the secondary water are mixed for a duration of between about 10 seconds and 1 minute before applying the solution to a textile, wherein the solution has a second peroxide weight percent that, when compared with the first peroxide weight percent, is at least reduced by a factor of 5.

9. The system of claim 8, wherein the peroxide is hydrogen peroxide.

10. The system of claim 8, further comprising EDTA as a stabilizing compound, the EDTA forming part of the buffering agent in the pre-application mode.

11. The system of claim 8, further comprising citric acid as a stabilizing compound, the citric acid forming part of the buffering agent in the pre-application mode.

12. The system of claim 8, wherein the cleaning device comprises a portable vacuum cleaning mechanism onboard a vehicle.

13. A method for treating textiles for odor removal, the method comprising:
    providing an oxidizing agent comprising hydrogen peroxide and water;
    providing a buffering agent comprising a carbonate salt and water;
    providing secondary water;

combining the oxidizing agent, the buffering agent, and the secondary water within a container;

mixing the oxidizing agent, the buffering agent, and the secondary water for a duration of between about 10 seconds and 1 minute to form a solution; and applying the solution to a textile to remove odor molecules from the textile.

14. The method of claim 13, wherein the solution removes stain molecules from the textile.

15. The method of claim 13, wherein combining the oxidizing agent and the buffering agent within a container comprises physically mixing the two agents for a duration of about 15 seconds.

* * * * *